US005910877A

United States Patent [19]

Paske et al.

[11] Patent Number: 5,910,877

[45] Date of Patent: Jun. 8, 1999

[54] LINE PROTECTOR FOR A COMMUNICATION CIRCUIT

[75] Inventors: Jamie M. Paske, Oak Lawn; Richard T. Kaczmarek, Chicago, both of Ill.

[73] Assignee: Reltec Corporation, Mayfield Heights, Ohio

[21] Appl. No.: 08/971,284

[22] Filed: Nov. 17, 1997

[51] Int. Cl.$^{6}$ .................................................... H02H 1/00

[52] U.S. Cl. ............................ 361/119; 361/56; 361/111; 361/115; 361/124

[58] Field of Search ............................... 361/56, 91, 111, 361/115, 117, 118, 119, 120, 124, 127

[56] References Cited

U.S. PATENT DOCUMENTS

| | | | |
|---|---|---|---|
| Re. 30,724 | 8/1981 | Klayum et al. | 361/124 |
| 3,587,021 | 6/1971 | Baumbach | 337/32 |
| 3,743,888 | 7/1973 | Baumbach | 317/16 |
| 3,755,715 | 8/1973 | Klayum et al. | 317/62 |
| 3,794,947 | 2/1974 | Baumbach | 337/32 |
| 3,818,271 | 6/1974 | Baumbach | 317/16 |
| 3,849,750 | 11/1974 | Baumbach et al. | 337/32 |
| 3,886,408 | 5/1975 | Klayum et al. | 317/16 |
| 3,886,411 | 5/1975 | Klayum | 317/62 |
| 4,168,515 | 9/1979 | Baumbach | 361/124 |
| 4,208,694 | 6/1980 | Gilberts | 361/119 |
| 4,233,641 | 11/1980 | Baumbach | 361/119 |
| 4,241,374 | 12/1980 | Gilberts | 361/124 |
| 4,262,317 | 4/1981 | Baumbach | 361/124 |
| 4,502,088 | 2/1985 | Baumbach | 361/124 |
| 4,901,188 | 2/1990 | Gilberts | 361/119 |
| 4,958,253 | 9/1990 | Gilberts et al. | 361/119 |

*Primary Examiner*—Jeffrey Gaffin
*Assistant Examiner*—Stephen Jackson
*Attorney, Agent, or Firm*—Trexler, Bushnell, Giangiorgi & Blackstone, Ltd.

[57] ABSTRACT

A novel current-limiting line protector for a communications circuit is disclosed, and includes a first and second incoming conductive member, a one piece roll-formed conductive member conductively coupled to each incoming conductive member, a ground member, an S-shaped spring in slidable contact with the ground member, and a first and second diode and solder member combination conductively coupled to the first and second incoming conductive members and disposed between the spring and the incoming conductive members. Each diode and solder member combination maintains the spring and the respective incoming conductive member in spaced, non-conducting relation while each solder member remains substantially intact. However, when excessive current is conducted along either incoming conductive member, the respective solder member deforms allowing the spring to slide toward the respective incoming conductive member and along the ground member and form at least a portion of a conductive path from the respective incoming conductive member to the ground member. The line protector is non-resetting after the spring has displaced along the ground member.

19 Claims, 8 Drawing Sheets

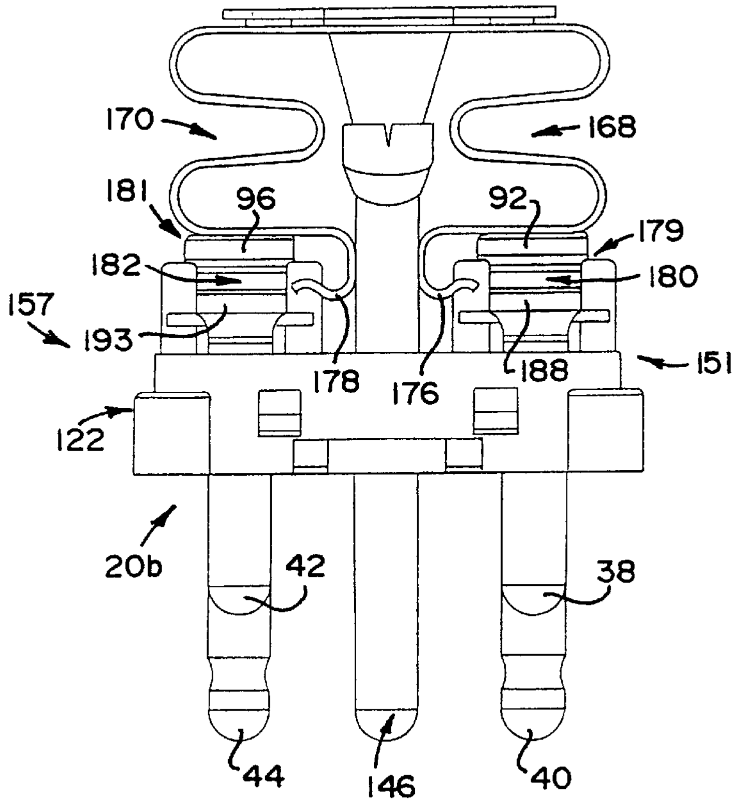
FIG. 7
FIG. 8
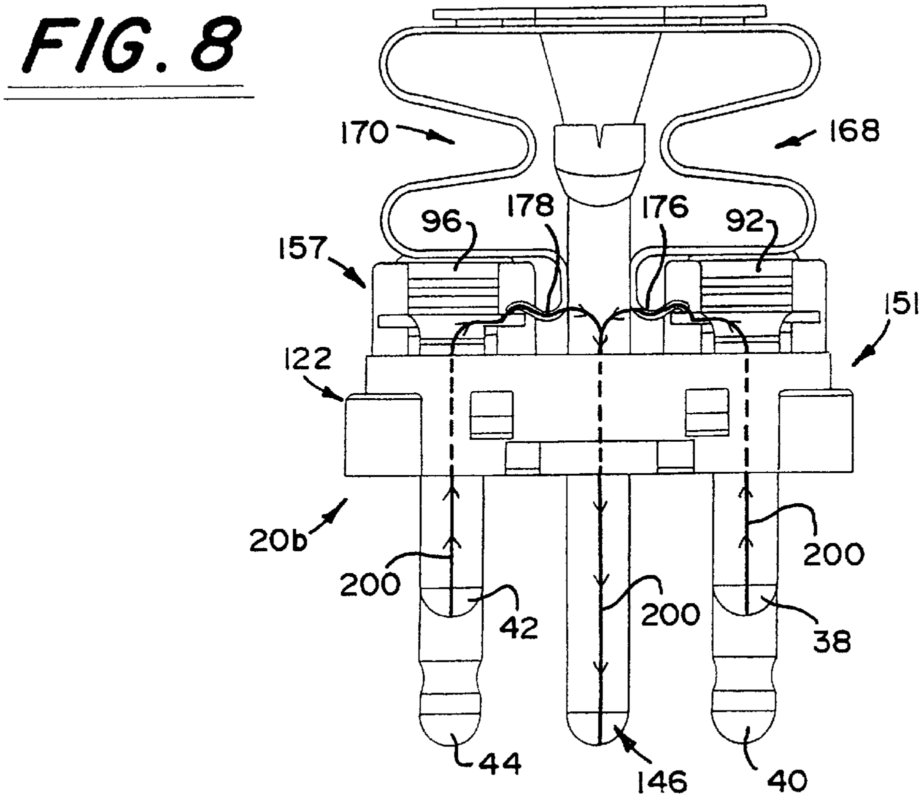

LINE PROTECTOR FOR A COMMUNICATION CIRCUIT

BACKGROUND

This invention is generally directed to line protectors for a communication circuit, and specifically relates to a novel line protector having a biasing member slidable along a ground member to form at least a portion of a conductive path thereto.

A line protector, such as a plug-in type line protector, is often used between an outside communication line and inside equipment such as, for example, central office switching equipment. The line protector is designed to protect the inside equipment from fault conditions, such as unwanted surge voltages and currents, on the outside communication line. Such fault conditions may result from lightening strikes or power line faults. The typical plug-in type line protector is comprised of several components, many of which are metallic, disposed within a housing snapped into engagement with a base. To assemble the line protector before installing the line protector between an outside communication line and inside equipment, the several components are normally "blindly" loaded into the housing, and then the housing is snapped onto the base. Because the components are loaded into the housing in this manner, it is relatively difficult to assemble the line protector before installing it between the outside communication line and inside equipment.

The base of the typical plug-in type line protector has several pins mounted thereon. At least one of the pins mounted on the base is for receiving current from the outside communication line while another is for forwarding the received current to the equipment. Additionally, a ground pin is typically mounted on the base, and the ground pin provides that, should a fault condition occur, the current received by the line protector is grounded and, as a result, is not forwarded to the equipment. To this end, the typical line protector is designed to provide that one or more components within the housing shift upon the occurrence of a fault condition. The shifting provides that the incoming current is grounded within the line protector. Unfortunately, this shifting of components within the line protector often results in unstable contact resistance to ,ground. For example, oxides may build up within the line protector over time, and the oxides may affect the contact resistance. As a result of poor contact resistance, the line protector will generate excessive heat upon the occurrence of a fault condition. Even worse, the presence of oxides within the line protector may cause arcing within the line protector, thereby allowing the excessive current to proceed past the line protector to the equipment.

As mentioned, several of the components within the housing of the typical line protector are metallic. Most line protectors provide that, upon the occurrence of a fault condition, most of the metallic components within the housing remain within the circuit from the incoming line to ground. As a result, excessive heat is generated within the line protector during the occurrence of a fault condition. However, it is desirable to minimize the amount of heat generated within a line protector during the occurrence of a fault condition.

The present invention is directed to eliminate the above-discussed problems which have been encountered heretofore.

Objects and Summary

A general object of the present invention may be to provide a line protector for a communication line where the line protector includes a minimum number of components.

Another object of the present invention may be to provide a line protector for a communication line where the line protector can be easily assembled by mounting a few components onto a base, and then snapping a housing thereto.

Still another object of the present invention may be to provide a line protector for a communication line where the line protector provides stable contact resistance upon the occurrence of a fault condition.

Still yet another object of the present invention may be to provide a line protector for a communication line where the line protector, upon the occurrence of a fault condition, minimizes the effect of oxides which have built up therein.

Still a further object of the present invention may be to provide a line protector for a communication line where the line protector provides for thermal management upon the occurrence of a fault condition.

Briefly, and in accordance with the foregoing, the present invention envisions a novel line protector for a communication circuit. The line protector includes an incoming conductive member, a ground member, a biasing member in slidable contact with the ground member, and an electrically responsive thermal device conductively coupled to the incoming conductive member and disposed between the biasing member and the incoming conductive member. The electrically responsive thermal device maintains the biasing member and the incoming conductive member in spaced, non-conducting relation while the electrically responsive thermal device remains substantially intact. However, should an excessive current be conducted along the incoming conductive member, the electrically responsive thermal device deforms thus allowing the biasing member to slide toward the incoming conductive member and along the ground member to form at least a portion of a conductive path from the incoming conductive member to the ground member.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 7 is an enlarged, side, elevational view through a portion of the housing of the second embodiment line protector of FIG. 6 showing both sides of the line protector in an untripped condition;

FIG. 8 is an enlarged, side, elevational view through a housing of the second embodiment line protector of FIG. 6 showing both sides of the line protector in a tripped condition;

DESCRIPTION

Figure 1:
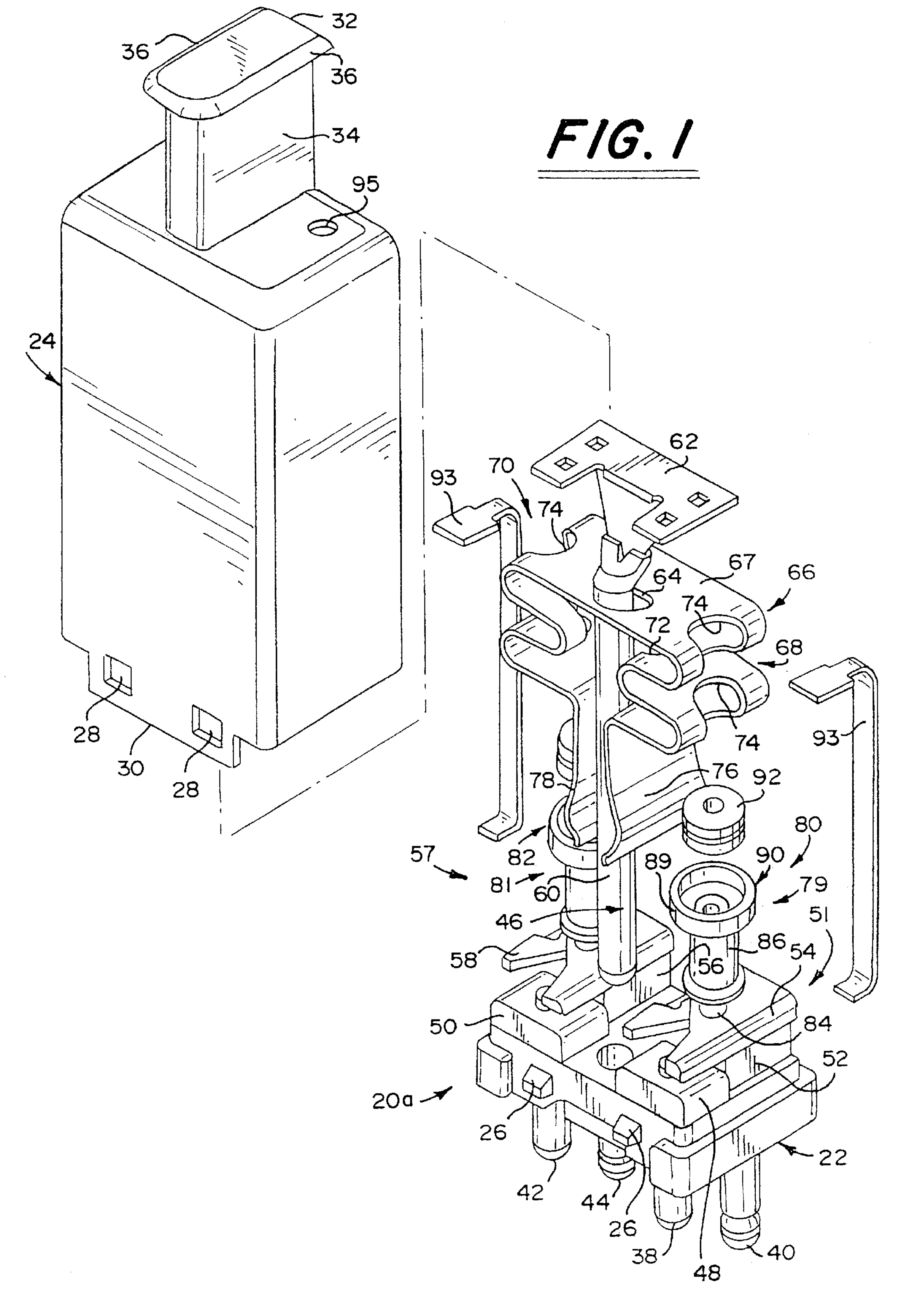
FIG. 1 is an enlarged, exploded, perspective view of a first embodiment line protector structure in accordance with the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Shown in the drawings are two line protectors 20*a* and 20*b* structured in accordance with the present invention. FIGS. 1–4 show a first embodiment line protector 20*a* while FIGS. 6–9 show a second embodiment line protector 20*b*. Both line protectors 20*a* and 20*b* are plug-in type line protectors designed to be installed between an outside communication line (not shown) and inside equipment (not shown), such as central office switching equipment. Both line protectors 20*a* and 20*b* are designed to protect the inside equipment from fault conditions, such as an overcurrent condition, on the outside communication line.

Both of the line protectors 20*a* and 20*b* depicted in the drawings are designed to accommodate a single communications circuit which comprises a pair of communication lines. Thus, most of the functional components are provided in pairs, one component of each pair being related to one of the two lines. However, the invention in its broader aspect is a protector for a single line, and some of the appended claims are directed to a line protector designed for protecting only a single line. The drawings and following description should be viewed with this in mind.

Shown in FIGS. 1–4 is a first embodiment line protector 20*a* structured in accordance with the present invention. Line protector 20*a* has a base 22 to which a housing 24 can be secured. As shown, the housing 24 is generally rectangular in cross section. Both the base 22 and the housing 24 arc formed of an insulating material such as plastic. The housing 24 can be secured to the base 22 in any suitable manner. For example, as shown, the base 22 may have bosses 26 thereon for snapping into engagement with apertures 28 provided at one end 30 of the housing 24. One having ordinary skill in the art would recognize many alternative means and structure for providing that the housing 24 can be secured to the base 22.

The other end 32 of the housing 24 terminates in a hollow reduced neck portion 34 having lateral flanges 36 at its extremity. The neck portion 34 and flanges 36 provide a convenient finger grip for manipulating the line protector 20*a* in and out of an associated receptacle (not shown) between an outside communication line and inside equipment.

The base 22 of line protector 20*a* has a plurality of conductive members, such as plug-in terminal pins, mounted thereon. A first incoming conductive member 38, such as a conductive pin, and a first outgoing conductive member 40, such as a conductive C.O. (Central Office) pin, are components of an electrical line through one side 51 of the line protector 20*a*. A second incoming conductive member 42, such as a conductive pin, and a second outgoing conductive member 44, such as a conductive C.O. (Central Office) pin, are components of the other electrical line through the other side 57 of the line protector 20*a*. Therefore, first incoming conductive member 38 is conductively connected to first outgoing conductive member 40 on one side 51 of the line protector 20*a*, and second incoming conductive member 42 is conductively connected to second outgoing conductive member 44 on the other side 57 of the line protector 20*a*. To this end, first incoming conductive member 38 and first outgoing conductive member 40 may be part of the same piece of metal having a flat, base piece extending therebetween (not shown), and second incoming conductive member 42 and second outgoing conductive member 44 may be similarly structured. Each may be a one piece roll-formed pin in order to consolidate parts. A ground member 46, such as a ground pin, extends through the middle of the base 22 from within the housing 24, and the ground member 46 is common to both lines through the line protector 20*a*, as will be seen. All of the members 38, 40, 42, 44 and 46 are formed of a resilient, conductive material such as a brass alloy plated with gold.

As shown in FIGS. 1–4, a switch board plate 48 is mounted on the base 22, and is located next to a sub-base 52. Both the switch board plate 48 and sub-base 52 are covered by a line plate 54. The switch board plate 48 is conductively coupled to the first incoming conductive member 38, and line plate 54 is conductively coupled to the switch board plate 48. Therefore, line plate 54 is essentially conductively coupled to the first incoming conductive member 38 through the switch board plate 48. Likewise, switch board plate 50 is mounted on the base 22, is located next to a sub-base 56, and both the switch board plate 50 and sub-base 56 are covered by a line plate 58. The switch board plate 50 is conductively coupled to the second incoming conductive member 42, and line plate 58 is conductively coupled to switch board plate 50. Therefore, line plate 56 is essentially conductively coupled to the second incoming conductive member 42 through the switch board plate 50 in much the same manner as line plate 54 is conductively coupled to the first incoming conductive member 38 through the switch board plate 48. While the sub-bases 52 and 56 are formed of an insulating material such as plastic, the line plates 54 and 58 and the switch board plates 48 and 50 are formed of a resilient, conductive material such as a nickel, silver and brass alloy plated with tin-lead.

Figure 2:
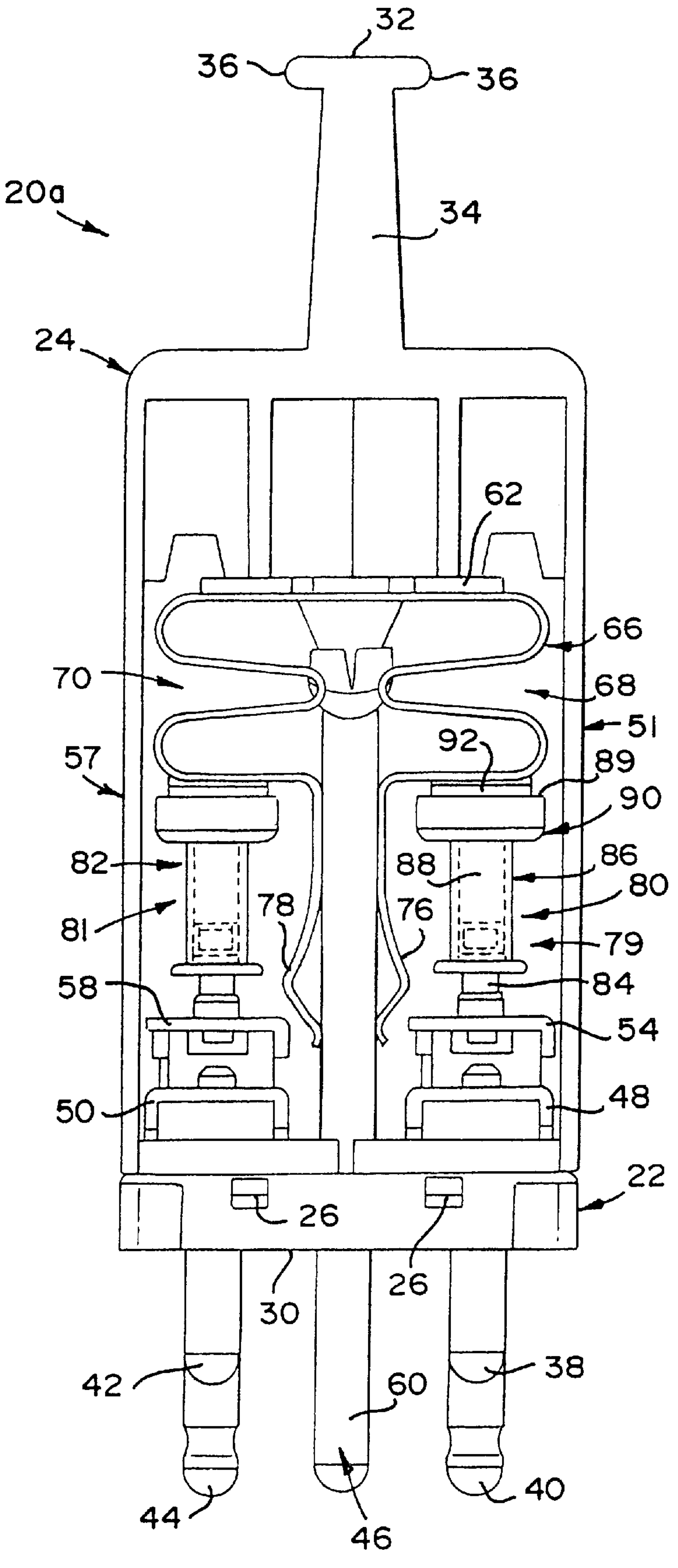
FIG. 2 is a partial fragmentary, cross-sectional, side, elevational view through a housing of the first embodiment line protector of FIG. 1, in an assembled state, showing the line protector in an untripped condition.
Figure 4:
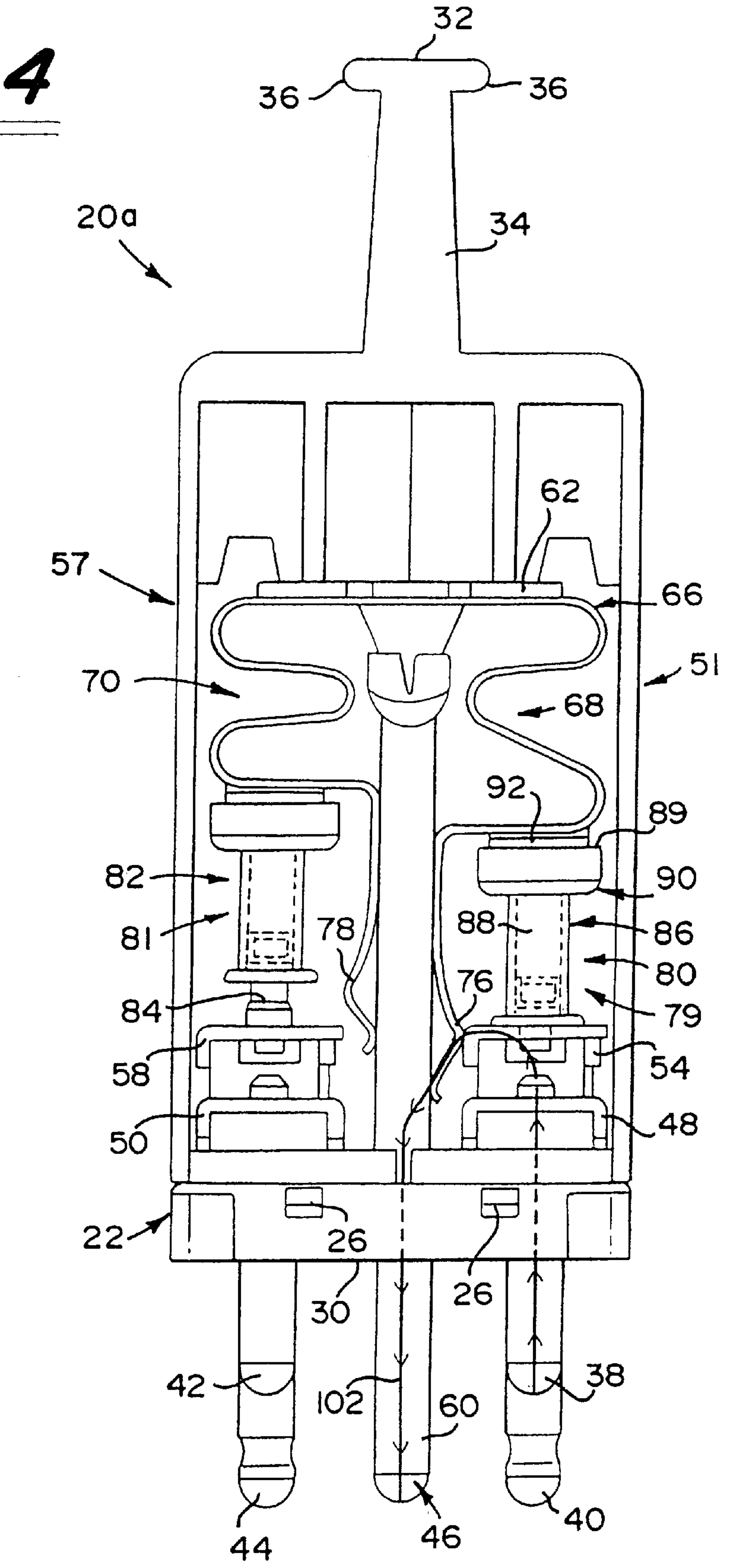
FIG. 4 is an enlarged, partial fragmentary, cross-sectional, side, elevational view through a housing of the first embodiment line protector of FIG. 1, in an assembled state, showing one side of the line protector in a tripped condition and the other side of the line protector in an untripped condition.
Figure 5:
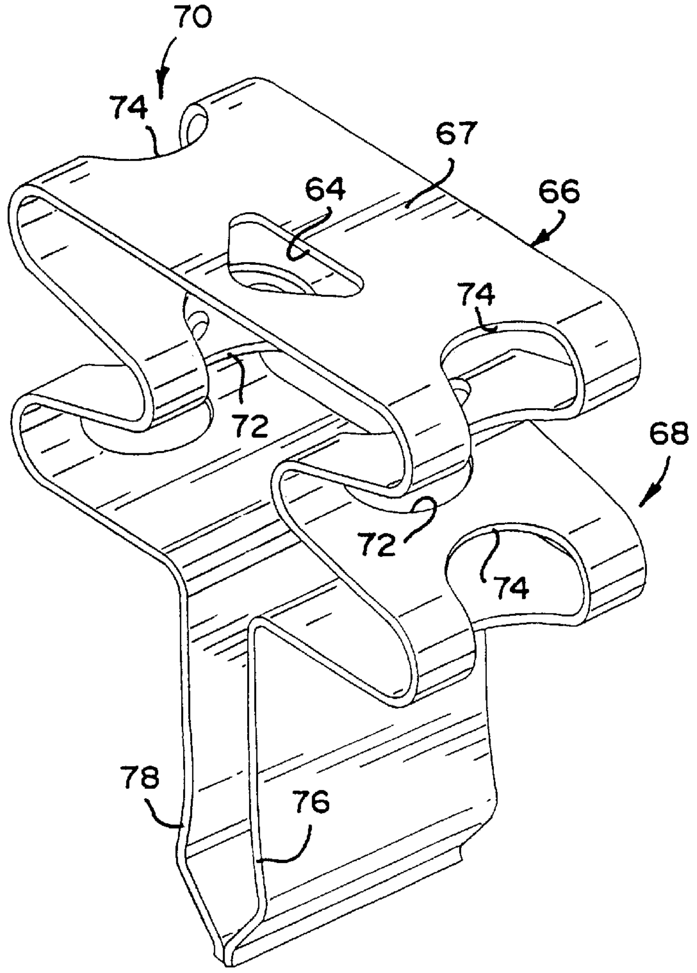
FIG. 5 is an enlarged, perspective view of a biasing component of the first embodiment line protector of FIGS. 1–4.

As mentioned, a ground member 46 extends through the middle of the base 22 from inside the housing 24. The ground member 46 has an extending portion 60 attached to a securing portion 62. The extending portion 60 of the ground member 46 extends through the base 22, while the securing portion 62 of the ground member 46 extends through a hole 64 in a biasing member 66 and rests on the top 67 of the biasing member 66. As shown in FIG. 5, the biasing member 66 may be a one piece, S-shaped or accordion shaped, spring having two sides, a first side 68 and a second side 70, and may have internal voids 72 and external voids 74 formed thereon. The internal voids 72 of the biasing member 66 provides clearance for the ground member 46 whenever both sides 68 and 70 of the biasing member 66 are in a compressed state as shown in FIGS. 2, or whenever at least one of the sides 68 or 70 of the biasing member 66 is in a compressed state as shown in FIG. 4 (side 70 shown compressed). At least one of the sides 68 or 70 of the biasing member 66 will be in a compressed condition whenever either side 51 or 57 of the line protector 20*a* remains "untripped" as will be described later hereinbelow. Both the internal voids 68 and external voids 70 on the biasing member 66 limit the load or for force needed to compress the biasing member 66.

Both sides 68 and 70 of the biasing member 66 include a depending leg 76 and 78, respectively, which contacts the extending portion 60 of the ground pin 46. To improve the contact between the legs 76 and 78 and the extending portion 60 of the ground pin 46, the extending portion 60 of the ground pin 46 may be provided with dimples thereon (not shown). The dimples would provide multiple contact points for the legs 76 and 78, and would concentrate pressure from the legs 76 and 78 in specific areas on the ground member 46 to provide a gas tight contact therebetween. This provides for a stable contact resistance. As shown in the progression from FIG. 2 to FIG. 3, both sides 68 and 70 of the biasing member 66 can extend and cause the legs 76 and 78 of the biasing member 66 to slide along the extending portion 60 of the ground member 46 and contact the line plates 54 and 58. Additionally, as shown in the progression from FIG. 2 to FIG. 4, the biasing member 66 provides that one side 68 of the biasing member 66 may remain compressed while the other side 70 of the biasing member 66 extends. As a result, only leg 76 of the biasing member 66 slides along the ground member 66 and contacts the line plate 54 while the other leg 74 remains spaced apart from the other line plate 58. For this reason, it can be said that biasing member 66 is independently acting.

The biasing member 66 is formed of a resilient, conductive material such as copper alloy plated with tin-lead; therefore, the contact between the ground pin 46 and the biasing member 66 is a conductive contact, and the contact which may result between the biasing member 66 and either line plate 54 or 58 is also a conductive contact. As a result, the biasing member 66 can forward current carried by either line plate 54 or 58 to the ground member 46 whenever the corresponding leg 76 or 78 slides along the ground member 46 and contacts the line plate 54 or 58. By forwarding the current from the line plate 54 or 58 to the ground member 46, the biasing member 66 keeps the current from going from the incoming conductive member 38 or 40, to the corresponding outgoing conductive member 40 or 44.

Disposed on one side 51 of the line protector 20*a*, compressed between the biasing member 66 and the line plate 54, is a first electrically responsive thermal device 79 such as a first diode and solder member combination 80. The first electrically responsive thermal device 79 contacts, and therefore is conductively coupled to, the line plate 54. Therefore, the first electrically responsive thermal device 79 is conductively coupled to the first incoming conductive member 38 through the line plate 54 and the switch board plate 48. While substantially intact, the first electrically responsive thermal device 79 maintains the leg 76 of the biasing member 66 and the first incoming conductive member 38 in spaced, non-conducting relation, as shown in FIG. 2.

Likewise, disposed on the other side 57 of the line protector 20*a*, compressed between the biasing member 66 and the line plate 58, is a second electrically responsive thermal device 81 such as a second diode and solder member combination 82. The second electrically responsive thermal device 81 is conductively coupled to the line plate 58, and therefore also to the second incoming conductive member 42 through the switch board plate 50. While substantially intact, the second electrically responsive thermal device 81 maintains the leg 78 of the biasing member 66 and the second incoming conductive member 42 in spaced, non-conducting relation. Preferably, both the first and second electrically responsive thermal devices 79 and 81 are identical; therefore, only the first electrically responsive thermal device 79 will be described. However, it is certainly anticipated that a different solder and/or diode (to be described) may be used within the two electrically responsive thermal devices 79 and 81, and this should be kept in mind.

Figure 3:
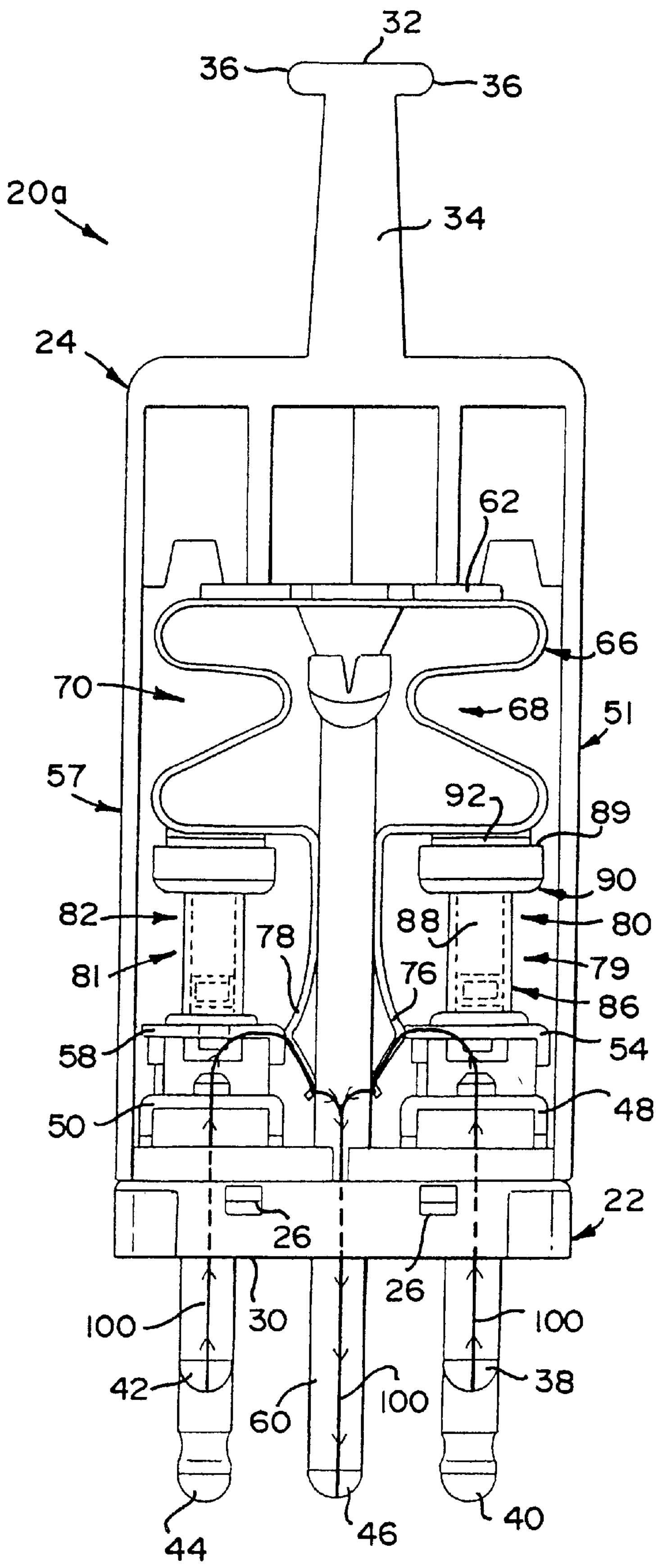
FIG. 3 is a partial fragmentary, cross-sectional, side, elevational view through a housing of the first embodiment line protector of FIG. 1, in an assembled state, showing both sides of the line protector in a tripped condition.

As mentioned, the first electrically responsive thermal device 79 may comprise a first diode and solder member combination 80 as shown in FIGS. 1–4. As shown, this first diode and solder member combination 80 may include a stationary pin 84 which extends upward from the line plate 54. The stationary pin 84 may be formed of a brass alloy plated with gold. The stationary pin 84 extends into a heat coil bobbin 86 which is held in place by a solder connection 88 therein. Like the stationary pin 84, the bobbin 86 may also be formed of a brass alloy. The end 89 of the bobbin 86 is configured in a cup 90, and within the cup 90 sits a diode 92, such as a 230 or 300 Volt solid state over voltage protector (SSOVP) diode. As shown in FIGS. 2, 3 and 4, the biasing member 66 presses on the diode 92. The biasing member 66 grounds the diode 92 as well as result of the contact between the securing portion 62 of the ground member 46 and the top 67 of the biasing member 66.

The solder connection 88 in the bobbin 86 comprises a solder which melts or deforms within a pre-determined temperature range, such as within a range of about 158 degrees to about 180 degrees Fahrenheit. The solder will reach this heightened temperature upon an excessive current being conducted along the first incoming conductive member 38, as will be described. As mentioned, preferably, the second electrically responsive thermal device 81 is structured identically to the first electrically responsive thermal device 79, and includes a stationary pin 84, a bobbin 86 having a solder connection 94 therein, and a diode 96. However, as mentioned, it is anticipated that the second electrically responsive thermal device 81 may be provided with a solder connection 94 that deforms at a different temperature as does the solder connection 88 of the first electrically responsive thermal device 79, and that the diode 96 of the second electrically responsive thermal device 81 may be different than that of the first electrically responsive thermal device 79. In this manner, the first electrically responsive thermal device 79 will deform at a different current than the second electrically responsive thermal device 81. As a result, full advantage may be taken of the fact that the biasing member 66 can extend on only one side 68 or 70 will maintaining the other side 68 or 70 in a compressed condition.

As shown, conductive test contacts 93 may be provided so that either side 51 or 57 of the line protector 20*a* can be tested through test holes 95 (one shown) in the housing 24.

When an excessive current is conducted along either the first or second incoming conductive member 38 or 42, this is an overcurrent fault condition, and the line protector 20*a* is designed to react thereto and keep the current from being forwarded to equipment. Shown in FIG. 2 is the line protector 20*a* when acceptable current is being conducted along both the first and second incoming conductive members 38 and 42. During such a situation, both the first and second electrically responsive thermal devices 79 and 81 remain substantially intact. As a result, the first and second electrically responsive thermal devices 79 and 81 maintain both sides 68 and 70 of the biasing member 66 in a compressed state against the securing portion 62 of the ground member 46. Therefore, the legs 76 and 78 of the biasing member 66 and the line plates 54 and 58 are maintained in spaced, non-conducting relation. However, at this time, the legs 76 and 78 still contact the extending portion of the ground member 46. As a result of the legs 76 and 78 and the line plates 54 and 58 being maintained in spaced, non-conducting relation, current carried by the first and second incoming conductive members 38 and 42 can proceed to the first and second outgoing conductive members 40 and 44 and therefore to the inside equipment.

As shown in the progression from FIG. 2 to FIG. 3, should excessive current be conducted along both incoming conductive members 38 and 42, both the first and second electrically responsive thermal devices 79 and 81 deform. For example, should each of the first and second electrically responsive thermal devices 79 and 81 comprise a diode and solder member combination 80 and 82, respectively, the excessive current conducted along the incoming conductive members 38 and 42 would cause the diodes 92 and 96 to heat up the heat coil bobbins 86 which are held in place by the solder connections 88 and 94 on each side 51 and 57 of the line protector 20*a*. The heated diodes 92 and 96 cause the solder connections 88 and 84 to melt and release the bobbins 86 on each side 51 and 57 of the line protector 20*a*. Both sides 68 and 70 of the biasing member 66 extends and forces the heat coil bobbins 86 down the stationary pins 84 until each bobbin 86 come into contact with a corresponding line plate 54 and 58. When the biasing member extends, the legs 76 and 78 of the biasing member 66 slide and wipe along the extending portion 60 of the ground pin 46 until each of the legs 76 and 78 contacts a corresponding line plate 54 and 58.

At this time, the line plates 54 and 58 apply contact forces to the legs 76 and 78, respectively, against the ground member 46. These contact forces provide stable contact resistance therebetween. Additionally, the wiping of the legs 76 and 78 along the ground member 46 as the legs 76 and 78 slide therealong minimizes the effect that built-up oxides on the ground member 46 have on the contact resistance between the legs 76 and 78 and the ground member 46. Furthermore, the wiping reduces the possibility that multiple arcing will occur as a result of built-up oxides thus causing the excessive current to forward to the outgoing conductive members 40 and 44 and then to the inside equipment. Therefore, the wiping contact between the biasing member 66 and the ground member 46 provides a substantial advantage over the prior art.

The contact between the legs 76 and 78 of the biasing member 66 and the line plates 54 and 58, respectively, provide for a minimal conductive grounding path from the first and second incoming conductive members 38 and 42 to the ground member 46, and provides for good thermal management by getting the current in and out of both sides 51 and 57 of the line protector 20*a* as quickly as possible. Additionally, as shown in FIG. 3. the contact between the legs 76 and 78 and the line plates 54 and 58, respectively, provides that much metal is kept out of the circuit path 100 between the first and second incoming conductive members 38 and 42 and the ground member 46. Specifically, the heat coil bobbins 86, most of the surface of the biasing member 66 and the ground member 46, the diodes 92 and 96, and both stationary pins 84 are kept out of the circuit path 100. All this metal that is kept out of the circuit path 100 can work as heat sinks rather than heat generators, thus further keeping the temperature of the line protector 20*a* down during the occurrence of a fault condition. During the occurrence of a fault condition, the line protector 20*a* can sustain thirty Amperes of current for fifteen minutes along either line. Therefore, the ground pin 46 will conduct sixty amperes for this period of time.

As shown in the progression of FIG. 2 and FIG. 4, should excessive current be conducted along only one incoming conductive member such as the first incoming conductive member 38, only the first electrically responsive thermal device 79 deforms while the second electrically responsive thermal device 81 remains intact. Specifically, the excessive current conducted along the first incoming conductive member 38 would cause the diode 92 to heat up the heat coil bobbin 86 on the one side 51 of the line protector 20*a* which is held in place by solder connection 88. The heat from the diode 92 causes the solder to melt and release the bobbin 86. The one side 68 of the biasing member 66 extends and forces the heat coil bobbin 86 down the stationary pin 84 on the one side 51 of the line protector 20*a* until the bobbin 86 comes into contact with the line plate 54. When the side 68 of the biasing member 66 extends, the leg 76 slides and wipes along the extending portion 60 of the ground pin 46 until it contacts the line plate 54.

At this time, the line plate 54 applies a contact force to the leg 76 against the ground member 46, and this contact force provides stable contact resistance therebetween. Additionally, the wiping of the leg 76 along the ground member 46 as the leg 76 slides therealong minimizes the effect that built-up oxides on the ground member 46 have on the contact resistance between the leg 76 and the ground member 46. Furthermore, the wiping reduces the possibility that multiple arcing will occur as a result of built-up oxides thus causing the excessive current to forward to the outgoing conductive member 40 and then to the inside equipment.

The contact between the leg 76 of the biasing member 66 and the line plate 54 provides for a minimal conductive grounding path from the first incoming conductive member 38 to the ground member 46, and provides for good thermal management by getting the current in and out of the one side 51 of the line protector 20*a* as quickly as possible. Additionally, as shown in FIG. 4. the contact between the leg 76 and the line plate 54 provides that much metal is kept out of the circuit path 102 between the first incoming conductive member 38 and the ground member 46. Specifically, the heat coil bobbin 86 on the one side 51 of the line protector 20*a*, most of the surface of the one side 68 of the biasing member 66 and the ground member 46, the diode 92, and the stationary pin 84 on the one side 51 of the line protector are kept out of the circuit path 102. All this metal that is kept out of the circuit path 102 can work as heat sinks rather than generating heat, thus further keeping the temperature of the line protector 20*a* down during a fault condition.

Because the second incoming conductive member 42 is conducting acceptable current, the second electrically responsive thermal device 81 and specifically, the solder connection 94 remains intact. Therefore, that corresponding side 70 of the biasing member 66 remains compressed, and the corresponding leg 78 of the biasing member 66 remains in a spaced, non-conducting relation to the line plate 58. Therefore, the current carried by the second incoming conductive member 42 can proceed to the second outgoing conductive member 44 and can therefore proceed to the inside equipment.

In contrast to the prior art, the line protector 20*a* shown in FIGS. 1–4 need not be "blindly" assembled, and can be assembled in a manner which provides that one can see what one is doing when assembling the line protector 20*a*. By cradling the diodes 92 and 96 between the biasing member 66 and their corresponding bobbins 86, and securing the ground member 46 to the biasing member 66, the line protector 20*a* can be assembled from the base 22 up before snapping the housing 24 onto the base 22.

Shown in FIGS. 6–9 is a second embodiment line protector 20*b*. Because there are some components of the second embodiment line protector 20*b* which are identical to the first embodiment line protector 20*a*, identical reference numerals are used, and the description thereof is omitted.

Figure 9:
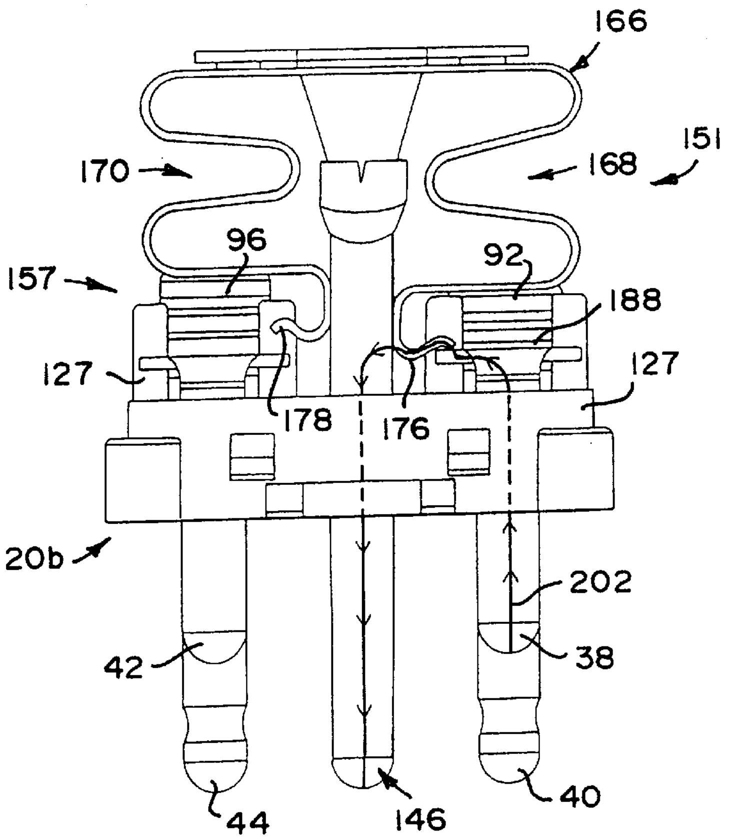
FIG. 9 is an enlarged, side, elevational view through a housing of the second embodiment line protector of FIG. 6 showing one side of the line protector in a tripped condition and the other side of the line protector in an untripped condition.
Figure 10:
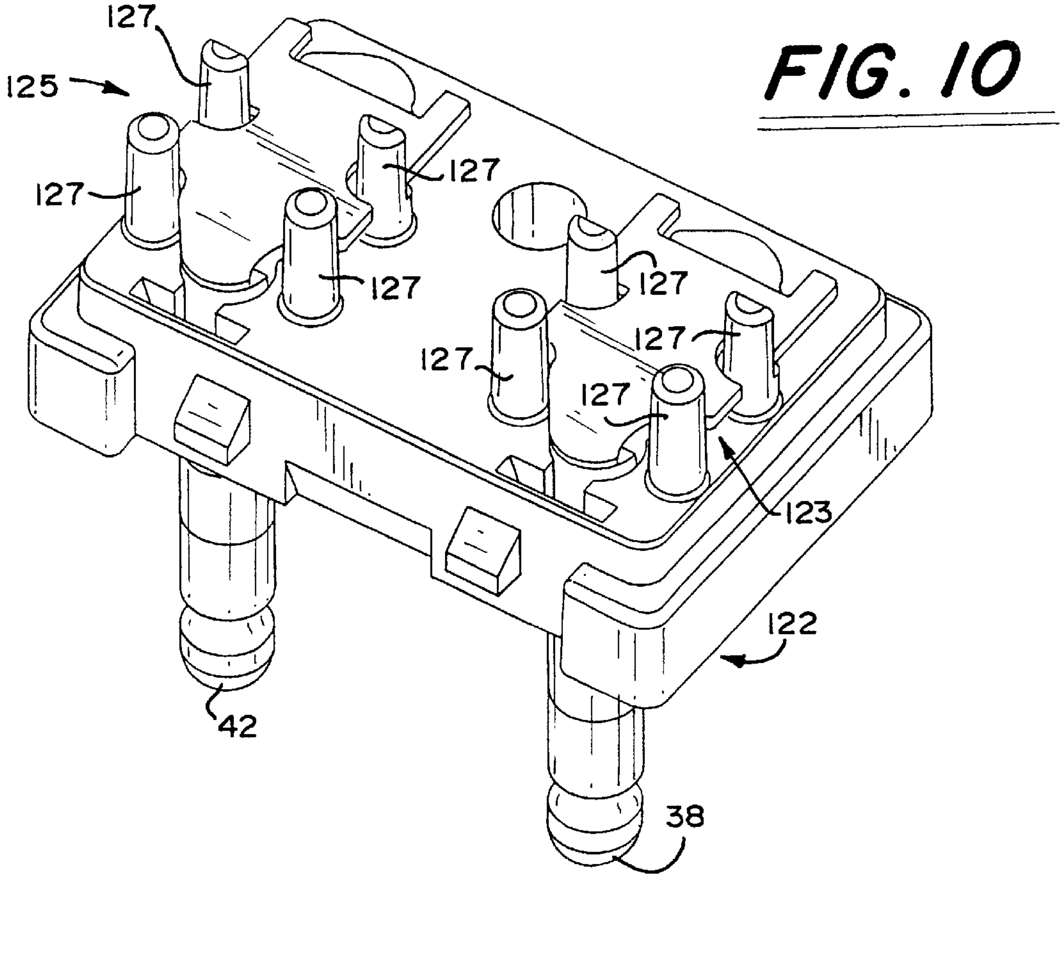
FIG. 10 is an enlarged, perspective view of a base component of the second embodiment line protector of FIGS. 6–9.

A base 122 of the second embodiment line protector 20*b* is shown alone in FIG. 10 and, as shown in FIGS. 6–9, is securable to a housing (not shown) by way of engaging bosses 26 on the base 122 with apertures in the housing. As shown, the base 122 has two sets 123 and 125 of four posts 127 molded thereon. The first set 123 of posts 127 retains a first electrically responsive thermal device 179 between the base 122 and a biasing member 166 on one side 151 of the line protector 20*b*. Likewise, the other set 125 of posts 127 retains a second electrically responsive thermal device 181 between the base 122 and a biasing member 166 on the other side 157 of the line protector 20*b*. Each of the first and second electrically responsive thermal devices 179 and 181 may comprise a first and second diode and solder member combination 180 and 182, respectively. As shown, the first diode and solder member combination 180 may comprise a solder pellet 188 in series with a diode 92. Additionally, the second diode and solder member combination 182 may comprise a solder pellet 193 in series with a diode 96.

Figure 11:
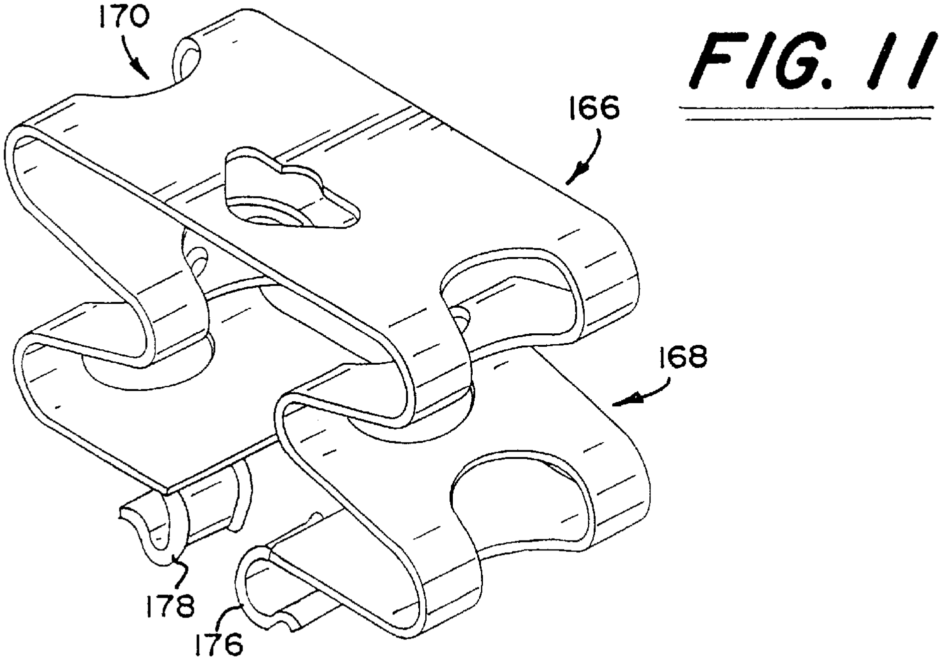
FIG. 11 is an enlarged, perspective view of a biasing component of the second embodiment line protector of FIGS. 6–9.
Figure 6:
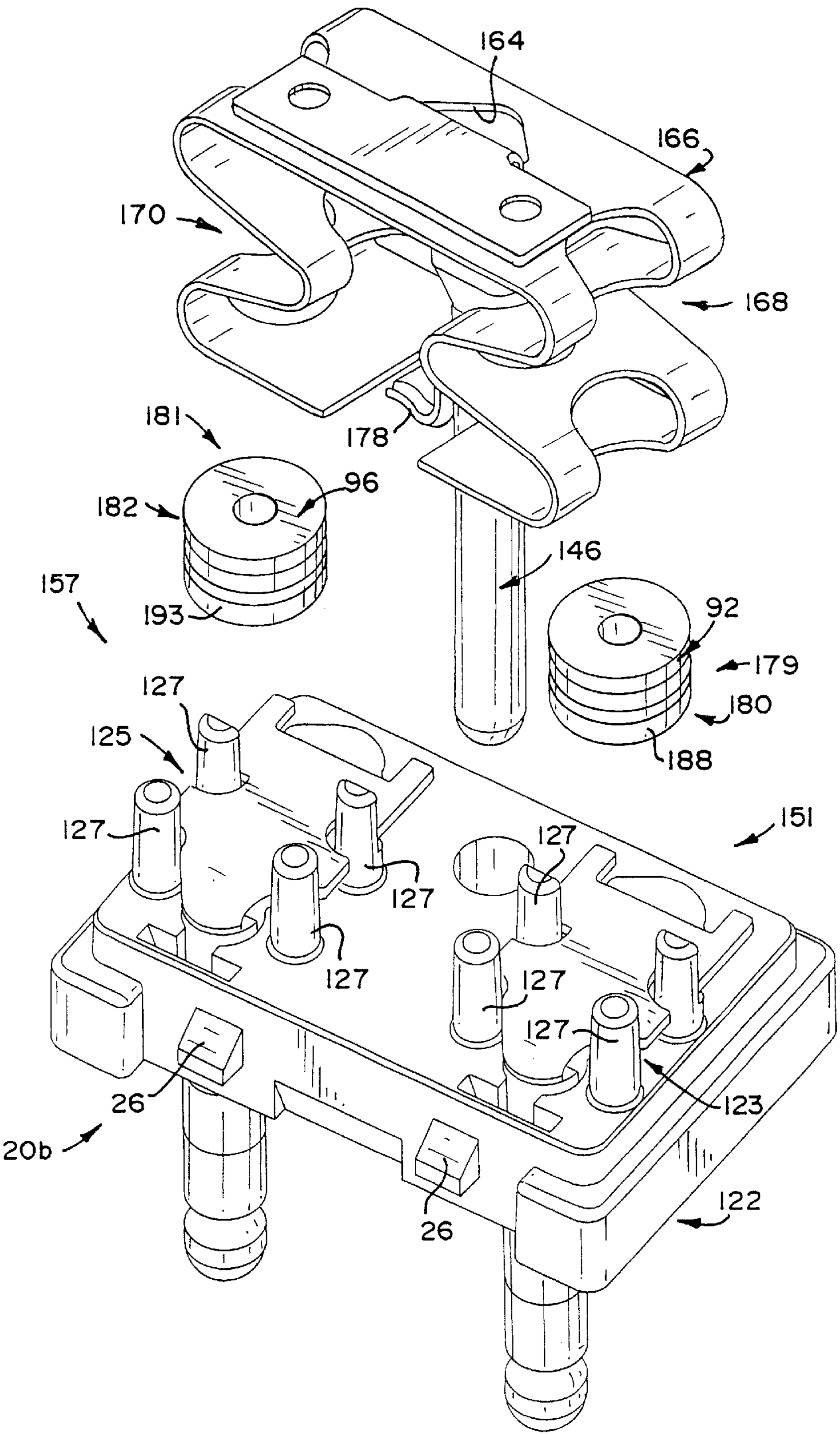
FIG. 6 is an enlarged, exploded, perspective view of a second embodiment line protector structure in accordance with the present invention.

As shown, a biasing member 166 presses on the diodes 92 and 96. The biasing member is shown alone in FIG. 11 for clarity. As shown, the biasing member 166 of the second embodiment line protector 20*b* is much like the biasing member 66 of the first embodiment line protector 20*a*, which is shown alone shown in FIG. 5. However, as shown in FIG. 11, the biasing member 166 of the second embodiment line protector 20*b* has a shorter profile, and therefore the legs 176 and 178 thereof are shaped a little differently. As with the first embodiment line protector 20*a*, the second embodiment line protector 20*b* provides that a ground member 146 extends through a hole 164 in the biasing member 166 and that the legs 176 and 178 of the biasing member 166 contact a ground member 146. The ground member 146 of the second embodiment line protector 20*b* is slightly shorter in length than the ground member 46 of the first embodiment line protector 20*a* due to the shorter profile of the second embodiment line protector 20*b*.

Each of the solder pellets 188 and 193 between the diodes 92 and 96 and the base 122 melts or deforms within a pre-determined range. Either one of the solder pellets 188 and 193 will reach a heightened temperature and melt or deform upon an excessive current being conducted along the corresponding incoming conductive member 38 or 42, as will be described. Preferably, the second electrically responsive thermal device 181 is structured identically to the first electrically responsive thermal device 179. However, it is anticipated that different types of solder pellets and diodes may be used so that the second electrically responsive thermal device 181 deforms at a different temperature than does the first electrically responsive thermal device 179. As a result, full advantage may be taken of the fact that the biasing member 166 can extend on only one side 168 or 170 while maintaining the other side 168 or 170 in a compressed state.

Shown in FIG. 7 is the line protector 20*b* when acceptable current is being conducted along both the first and second incoming conductive members 38 and 42. During such a situation, both the first and second electrically responsive thermal devices 179 and 181 remain substantially intact. Specifically, both of the solder pellets 188 and 193 remain substantially undeformed and intact. As a result, both sides 168 and 170 of the biasing member 166 are maintained in a compressed state against the securing portion 162 of the ground member 146. Therefore, the legs 176 and 178 of the biasing member 166 and the first and second incoming conductive members 38 and 42 are maintained in spaced, non-conducting relation. However, at this time, the legs 176 and 178 of the biasing member 166 still contact the extending portion 160 of the ground member 146. As a result of the legs 176 and 178 and the first and second incoming conductive members 38 and 42 being maintained in spaced, non-conducting relation, current carried by the first and second incoming conductive members 38 and 42 can proceed to the first and second outgoing conductive members 40 and 44 and therefore to the inside equipment.

As shown in the progression from FIG. 7 to FIG. 8, should excessive current be conducted along both incoming conductive members 38 and 42, both the first and second electrically responsive thermal devices 79 and 81 deform. Specifically, the excessive current causes the diodes 92 and 96 to heat up the solder pellets 188 and 193 which melt or deform as a result. As a result of the solder pellets 188 and 193 melting or deforming, both sides 168 and 170 of the biasing member 166 extends and forces the diodes 92 and 96 down toward the base 122. When the biasing member 166 extends, the legs 176 and 178 thereof slide and wipe along the ground pin 146 until the legs 176 and 178 contact the first and second incoming conductive members 38 and 42, respectively.

At this time, the first and second incoming conductive members 38 and 42 apply contact forces to the legs 176 and 178, respectively, against the ground member 146. These contact forces provide stable contact resistance therebetween. Additionally, the wiping of the legs 176 and 178 along the ground member 146 as the legs 176 and 178 slide therealong minimizes the effect that built-up oxides on the ground member 146 have on the contact resistance between the legs 176 and 178 and the ground member 146. Furthermore, the wiping reduces the possibility that multiple arcing will occur as a result of built-up oxides thus causing the excessive current to forward to the outgoing conductive members 40 and 44 and then to the inside equipment.

The contact between the legs 176 and 178 of the biasing member 166 and the first and second incoming conductive members 38 and 42, respectively, provides for a minimal conductive grounding path from the first and second incoming conductive members 38 and 42 to the ground member 46, and provides for good thermal management by getting the current in and out of both sides 151 and 157 of the line protector 20*b* as quickly as possible. Additionally, as shown in FIG. 8. the contact between the legs 176 and 178 and the first and second incoming conductive members 38 and 42, respectively, provides that much metal is kept out of the circuit path 200 between the first and second incoming conductive members 38 and 42 and the ground member 146. Specifically, most of the surface of the biasing member 166 and the ground member 146, and the entire surface of the diodes 92 and 96 are kept out of the circuit path 200. All this metal that is kept out of the circuit path 200 can work as heat sinks rather than heat generators, thus further keeping the temperature of the line protector 20*b* down during the occurrence of a fault condition.

As shown in the progression of FIG. 7 and FIG. 9, should excessive current be conducted along only one incoming conductive member such as the first incoming conductive member 38, only the first electrically responsive thermal device 179 deforms while the second electrically responsive thermal device 181 remains intact. Specifically, the solder pellet 188 on the one side 151 of the line protector 20*b* deforms or melts while the other solder pellet 193 on the other side 157 of the line protector 20*b* remains substantially intact. The excessive current conducted along the first incoming conductive member 38 causes the diode 92 to heat up the solder pellet 188 and the solder pellet 188 melts or deforms. Therefore, the corresponding side 168 of the biasing member 166 extends and forces the diode 92 toward the base 122. When the side 168 of the biasing member 166 extends, the leg 176 slides and wipes along the ground pin 146 until it contacts the first incoming conductive member 38.

At this time, the first incoming conductive member 38 applies a contact force to the leg 176 against the ground member 146, and this contact force provides stable contact resistance therebetween. Additionally, the wiping of the leg 176 along the ground member 146 as the leg 176 slides therealong minimizes the effect that built-up oxides on the ground member 146 have on the contact resistance between the leg 176 and the ground member 146. Furthermore, the wiping reduces the possibility that multiple arcing will occur as a result of built-up oxides thus causing the excessive current to forward to the outgoing conductive member 40 and then to the inside equipment.

The contact between the leg 176 of the biasing member 166 and the first incoming conductive member 38 provides for a minimal conductive grounding path from the first incoming conductive member 38 to the ground member 46, and provides for good thermal management by getting the current in and out of the one side 151 of the line protector 20*b* as quickly as possible. Additionally, as shown in FIG. 9, the contact between the leg 176 and first incoming conductive member 38 provides that much metal is kept out of the circuit path 202 between the first incoming conductive member 38 and the ground member 146. Specifically, most of the surfacc of one side 168 of the biasing member 166, the ground member 146, and the diodes 92 are kept out of the circuit path 202. All this metal that is kept out of the circuit path 202 can work as heat sinks rather than generating heat, thus further keeping the temperature of the line protector 20*b* down during a fault condition.

Because the second incoming conductive member 42 is conducting acceptable current, the other solder pellet 193 remains substantially intact. Therefore, that corresponding side 170 of the biasing member 166 remains compressed, and the corresponding leg 178 of the biasing member 166 remains in a spaced, non-conducting relation to the second incoming conductive member 42. Therefore, the current carried by the second incoming conductive member 42 can proceed to the second outgoing conductive member 44 and can therefore proceed to the inside equipment.

The line protector 20*b* shown in FIGS. 6–9 can also be assembled in a manner which provides that one can see what one is doing when one is assembling the line protector 20*b*. By cradling the diodes 92 and 96 and solder pellets 188 and 193 between the biasing member 166 and the base 122, and securing the ground member 146 to the biasing member 166, the line protector 20*b* can be easily assembled from the base 122 up before snapping the housing 124 onto the base 122.

While preferred embodiments of the present invention are shown and described, it is envisioned that those skilled in the art may devise various modifications of the present invention without departing from the spirit and scope of the appended claims.

The invention claimed is:

1. A line protector for a communication circuit, said line protector comprising: an incoming conductive member; a ground member; a biasing member in displaceable contact with said ground member and contractable with said incoming conductive member; an electrically responsive thermal device conductively coupled to said incoming conductive member and disposed between said biasing member and said incoming conductive member. said electrically responsive thermal device maintaining said biasing member and said incoming conductive member in spaced, non-conducting relation while said electrically responsive thermal device remains substantially intact, whereby an excessive current conducted along said incoming conductive member causes said electrically responsive thermal device to deform allowing said biasing member to be displaced toward said incoming conductive member in wiping contact along said ground member and into contact with said incoming conductive member to form at least a portion of a conductive path from said incoming conductive member to said ground member.

2. A line protector according to claim 1, wherein said biasing member comprises an S-shaped spring.

3. A line protector according to claim 1, further comprising a one piece roll-formed outgoing conductive member conductively coupled to said incoming conductive member.

4. A line protector according to claim 1, wherein said line protector is non-resetting, whereby said line protector cannot be reset after said biasing member has slid along said ground member and has formed at least a portion of a conductive path to said ground member.

5. A line protector according to claim 1, wherein said line protector is current-limiting.

6. A line protector according to claim 1, further comprising a second incoming conductive member; a second electrically responsive thermal device conductively coupled to said second incoming conductive member and disposed between said biasing member and said second incoming conductive member, said second electrically responsive thermal device maintaining said biasing member and said second incoming conductive member in spaced, non-conducting relation while said second electrically responsive thermal device remains substantially intact, whereby an excessive current conducted along said second incoming conductive member causes said second electrically responsive thermal device to deform allowing said biasing member to slide toward said second incoming conductive member and along said ground member and form at least a portion of a conductive path from said second incoming conductive member to said ground member, said biasing member capable of sliding toward one of said first or second incoming conductive members and not toward the other, whereby said biasing member forms at least a portion of a conductive path from said one of said first or second incoming conductive members to said ground member and not from the other of said first or second incoming conductive members to said ground member.

7. A line protector according to claim 6, wherein said electrically responsive thermal device comprises a first diode and solder member combination, and wherein said second electrically responsive thermal device comprises a second diode and solder member combination.

8. A line protector according to claim 7, said first diode and solder member combination comprising a first solid state over voltage protector diode in series with a first solder pellet, and said second diode and solder member combination comprising a second solid state over voltage protector diode in series with a second solder pellet, said first diode and solder member combination being held in place between said biasing member and said first incoming conductive member by posts molded into a base, said second diode and solder member combination being held in place between said biasing member and said second incoming conductive member by posts molded into said base, said first diode located between said first solder pellet and said biasing member, said second diode located between said second solder pellet and said biasing member, said first solder pellet located between said first diode and said base, and said second solder pellet located between said second diode and said base.

9. A line protector according to claim 7, wherein each of said first and second diode and solder member combinations comprises: a solid state over voltage protector diode; a bobbin having a cup at an end thereof holding said diode; and a meltable solder holding said bobbin in place.

10. A line protector for a communications circuit, said line protector comprising: a base; an incoming conductive member mounted on said base; a conductive ground member extending through said base; a biasing member in wipeable contact with said ground member and contactable with said incoming conductive member, said biasing member being slidable and extendible along said ground member; a deformable assembly coupled to said incoming conductive member, said deformable assembly disposed between said biasing member and said incoming conductive member and maintaining said biasing member and said incoming conductive member in spaced, non-conducting relation when said deformable assembly is substantially undeformed, said deformable assembly deforming when current exceeding a desired level is conducted along said incoming conductive member, said biasing member extending and sliding along said ground member in wiping contact therewith and into contact with said incoming conductive member when said deformable assembly deforms, and said biasing member electrically connecting to said incoming conductive member when said biasing member extends and slides along said ground member in wiping contact therewith thereby forming at least a portion of a conductive path from said incoming conductive member to said ground member.

11. A line protector according to claim 10, wherein said biasing member comprises an S-shaped spring.

12. A line protector according to claim 10, further comprising a one piece roll-formed outgoing conductive member conductively coupled to said incoming conductive member.

13. A line protector according to claim 10, wherein said line protector is non-resetting, whereby said line protector cannot be reset after said biasing member has slid and extended along said ground member and has formed at least a portion of a conductive path to said ground member.

14. A line protector according to claim 10, wherein said line protector is current-limiting.

15. A line protector according to claim 10, further comprising a second incoming conductive member mounted on said base; a second deformable assembly coupled to said second incoming conductive member and disposed between said biasing member and said second incoming conductive member, said second deformable assembly maintaining said biasing member and said second incoming conductive member in spaced, non-conducting relation when said second deformable assembly is substantially undeformed, whereby said second deformable assembly deforms when current exceeding a desired level is conducted along said second incoming conductive member, said biasing member extending and sliding along said ground member when said second deformable assembly deforms, and said biasing member electrically connecting to said second incoming conductive member when said biasing member extends and slides along said ground member thereby forming at least a portion of a conductive path from said second incoming conductive member to said ground member, said biasing member capable of sliding toward one of said first or second incoming conductive members and not toward the other, whereby said biasing member forms at least a portion of a conductive path from said one of said first or second incoming conductive members to said ground member and not from the other of said first or second incoming conductive members to said ground member.

16. A line protector according to claim 15, wherein said deformable assembly comprises a first diode and solder member combination, and wherein said second deformable assembly comprises a second diode and solder member combination.

17. A line protector according to claim 16, said first diode and solder member combination comprising a first solid state over voltage protector diode in series with a first solder pellet, said second diode and solder member combination comprising a second solid state over voltage protector diode in series with a second solder pellet, said first diode and solder member combination held in place between said biasing member and said first incoming conductive member by posts molded into said base, said second diode and solder member combination held in place between said biasing member and said second incoming conductive member by posts molded into said base, said first diode between said first solder pellet and said biasing member, said second diode between said second solder pellet and said biasing member, said first solder pellet between said first diode and said base, said second solder pellet between said second diode and said base.

18. A line protector according to claim 16, wherein each of said first and second diode and solder member combinations comprises: a solid state over voltage protector diode; a bobbin having a cup at an end thereof holding said diode; and a meltable solder holding said bobbin in place.

19. A method of protecting a line of a communications circuit, said method comprising: connecting an incoming conductive member to the line; providing a ground member; providing a biasing member in slidable, wipeable contact with said ground member and contactable with said incoming conductive member; providing an electrically responsive thermal device conductively coupled to said incoming conductive member and disposed between said biasing member and said incoming conductive member, said electrically responsive thermal device maintaining said biasing member and said incoming conductive member in spaced, non-conducting relation while said electrically responsive thermal device remains substantially intact, whereby an excessive current conducted along said incoming conductive member causes said electrically responsive thermal device to deform allowing said biasing member to slide toward said incoming conductive member and along said ground member in wiping contact therewith and into contact said incoming conductive member to form at least a portion of a conductive path from said incoming conductive member to said ground member.

* * * * *